United States Patent [19]
Ericson

[11] 3,979,494

[45] Sept. 7, 1976

[54] METHOD OF PERFORATING THERMOPLASTIC FILM

[75] Inventor: Alvin E. Ericson, Chicago, Ill.

[73] Assignee: Union Carbide Corporation, New York, N.Y.

[22] Filed: July 3, 1975

[21] Appl. No.: 593,130

Related U.S. Application Data

[62] Division of Ser. No. 446,060, Feb. 26, 1974.

[52] U.S. Cl. .................................. 264/154; 156/82; 156/252

[51] Int. Cl.$^2$ ......................... B29F 5/00; B29D 7/20

[58] Field of Search ................ 264/154, 80; 156/82, 156/252, 253

[56] References Cited

UNITED STATES PATENTS

| | | | |
|---|---|---|---|
| 3,012,918 | 12/1961 | Schaar | 264/154 |
| 3,092,439 | 6/1963 | Harrison | 264/154 |
| 3,394,211 | 7/1968 | MacDuff | 156/252 |

*Primary Examiner*—Willard E. Hoag
*Attorney, Agent, or Firm*—Maurice W. Ryan

[57] ABSTRACT

A plastic film packaging bag is fabricated with directionally tear-prone wicket mounting holes having a hole edge reinforcing bead of plastic selectively thinner in the desired tearing direction formed by a hot gas stream directed through shaped templates holding the bag.

2 Claims, 6 Drawing Figures

Figure 5:
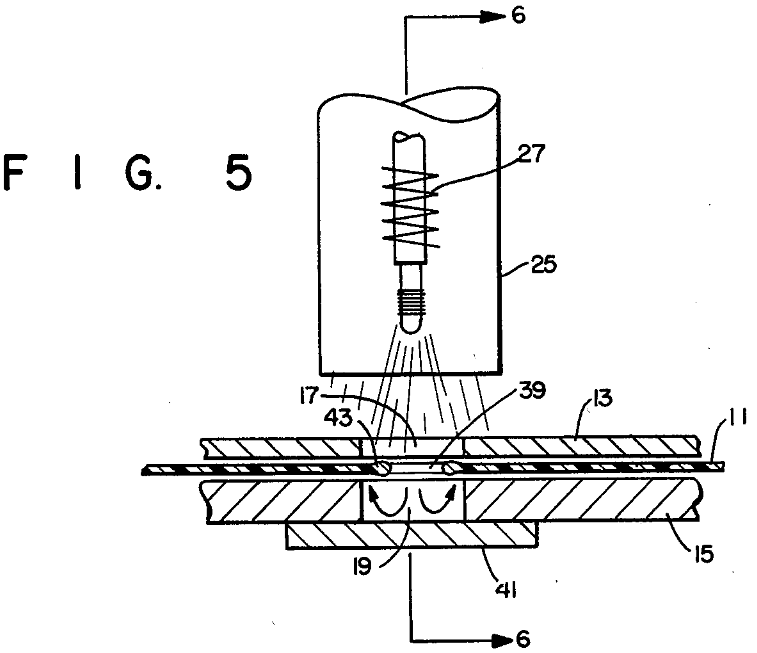

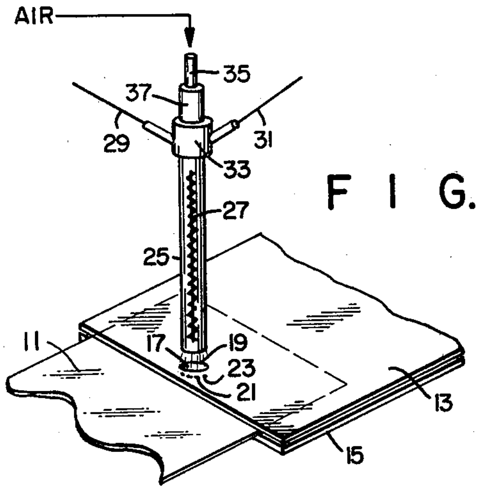
FIG. 1
FIG. 2
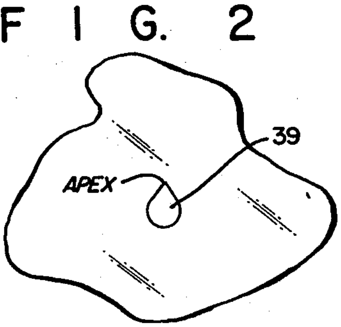
FIG. 3
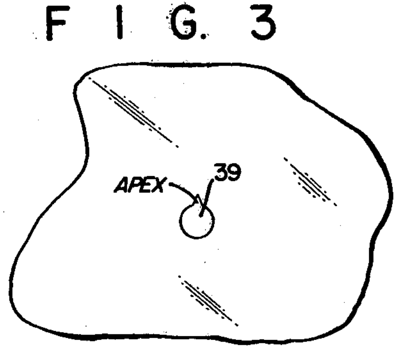
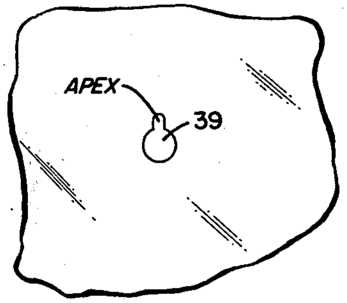
FIG. 4

METHOD OF PERFORATING THERMOPLASTIC FILM

This is a division of application Ser. No. 446,060 filed Feb. 26, 1974.

The present invention relates to plastic film bags or sheets furnished in stacked supplies held on wickets and which are to be dispensed or removed from the wicket-held stacks either manually or automatically, one at a time, for utilization, and more particularly, to such bags or sheets having specially formed wicket holes which permit facile removal from the wicket in a desired tear-removal direction without the incidental production of contaminating bag material scraps.

Packaging operations in industry are of significant import and interest towards promoting the rapid, efficient and economical packaging of products for the market. Food packaging generally and the meat packing industry in particular require additionally the strict maintenance of sanitary conditions. Automatic or semiautomatic packaging techniques have been developed towards achievement of these desired goals.

Here it should be noted that while the ensuing discussion treats of plastic film packaging bags towards illustrative simplification, this invention applies equally as well to stacked wicket-held plastic film wrapping sheets and the like.

Whatever the degree of complexity of the apparatus and techniques employed in a packaging operation involving food, meat products in particular, it is of the utmost importance that the supply of packaging bags be maintained in a sanitary condition and that the bag dispensing action be accomplished with facility and without bag waste or the incidental production of torn bag scraps which not only interfere with smooth and efficient operation but also contaminate the packaged food article. While these desirable characteristics are very important in even the simplest modes of semiautomatic packaging, they are of much greater importance in the more fully automated modes such as for instance those involving opening the bags one at a time with an air stream for insertion of a product unit into each bag sequentially. In these more automated techniques the relatively higher packaging speed necessitates a sanitary, continual and consistently reliable bag supply not liable to produce contaminating bag scraps during the packaging operation. Towards attaining these disiderata, the wicket to bag wicket hole relationship is a significantly important element in the operation. Bags for such use, irrespective of the complexity of the particular packaging technique, are usually supplied to the user in bulk packages which are opened and the bags loaded by hand into the bag dispensing station or portion of the apparatus or in prewicketed packages.

Criteria for the wicket to bag wicket hole relationship design dictate that each bag in turn atop a stack of wicketed bags at a packaging station must be readily removable without the incidental production of bag scraps and with clean direct tears through the bag material from the wicket holes to the outer open edge of each holed ply of the bag. Known wickets used to hold stacked bag supplies in the aforedescribed manner are best described as inverted U-shaped with the U having a flat bottom which, with the wicket in place, spans across the top bag of the stack along a line between the wicket holes to define a horizontal bearing member. The heart of the bagging system, however, is the bag itself. A number of bag structures have been shown in the patent literature. Specific reference is made to U.S. Pat. Nos. 3,441,198; 3,317,037; 3,352,411; 3,508,379; 3,156,273; and to Canadian Pat. No. 851,553. Bags have been produced from tubular film by sealing the tube at one end and from folded film by sealing at the sides, and others have been made by sealing two superimposed films at perimetral edges. In some bags, the front and rear walls are the same length. These are called "flush cut" bags. In others, the front wall is shorter than the rear wall. These are called "lipped" bags. In some tubular bags, the ends are arcuate and in some the front wall has a cut-out portion less than the flat width of the bag. The bags may be made of any suitable flexible plastic material. Seals to fabricate the bag structure may be formed in any way, heat sealing being convenient, economical, and preferred. For packaging meats a preferred material is polyvinylidene chloride. Other suitable materials are: polyolefins, e.g. polyethylene, or polypropylene; nylon; polyethylene terephthalate; polystyrene; and the copolymers of the foregoing materials.

At first blush it would seem that the wicket holes of whatever shape desired could be formed multiply in stacks of such packaging bags by relatively simple techniques such as straight mechanical punching or by hot punching, that is with a punch element heated sufficiently to melt the plastic as the punch pierces the bag stack. Mechanical punching through stacked bags, however, produces wicket holes with all sorts of random irregularities in the preselected shape and in hole edge integrity, with consequent high incidences of bag rejection in the production process and, even more detrimentally, bag failures through improper wicket tear-offs in use in packaging operations. The hot mechanical punch techniques are impractical for hole formation in stacked bags because the molten plastic flows from bag to bag in the stack, and the bags become in effect welded or heat sealed together at their wicket holes. Wicket hole formation in the bags individually, that is one at a time, similarly may utilize straight mechanical punching or the hot punch techniques. Bag production, however, is necessarily a high speed operation and must be so due to the production economics involved. High speed single bag wicket hole punching with a straight mechanical punch inherently produces film material scraps, requires punch replacement from time to time as the punch die or cutting edge dulls, and is thus not as completely a satisfactory solution as could be hoped for. The wicket holes thus formed, even if made to a preselected shape, have only simple shear cut edges and therefore contribute less than satisfactorily towards the goal of a wicket to bag hole relationship which effects the desired clean direct tears through the bag material from the wicket holes to the outer open edge of each holed ply of the bag without coincidental random tearing and production of contaminating bag scraps.

Hot punching the wicket holes in each bag one at a time, has, up to the time of the present invention, been the most conventional mode used in the industry. It is particularly in one at a time bag wicket hole forming with hot punches that experimental and developmental efforts have been directed towards making the wicket holes with directionally tear prone characteristics, that is to say the hole edge is so formed and/or shaped that the bag tends to resist tearing from the wicket in all but a preselected tearing direction. Hot punching produces a hole of whatever shape selected having a bead of melted and rehardened plastic around the hole edge. If the hole is tear drop shaped or outwardly notched in the desired tear direction, that is towards the bag mouth outer edge, a linear pulling force will tend to impose stress concentrations at the hole notch or tear drop point, and the bag, hopefully, will tend to tear linearly from the wicket holes to and through the bag mouth edge. It has been found however that the beads of melted and rehardened plastic around the edges of wicket holes thus formed do not have the consistently reproducible physical characteristics to meet commmercial use standards. The beads around holes so formed have been found frequently to include charred particles of resin from the plastic making for at worst contamination necessitating quality control rejection, and at best unsightly appearance.

The problems attending wicket hole forming described hereinabove, particularly when the holes formed have no edge reinforcing whatsoever, are even more serious with oriented plastic film sheet materials, since any nick, weakness, or irregularity in a hole edge can cause bag tearing failure along the weakest orientation line which may be in a completely unwanted direction.

With this then being the state of the art, the present invention was conceived and developed to provide a plastic film packaging bag or sheet for wicket mounting having a wicket hole which is directionally tear prone in a preselected desired direction.

The invention further provides a method for the production of plastic film packaging bags or sheets having bead reinforced edge wicket holes which are directionally tear oriented in a preselected direction unrelated to any orientation of the plastic film material itself.

Apparatus to practice the aforesaid method to produce the aforesaid bags or sheets is also comprehended in this invention.

Figure 6:
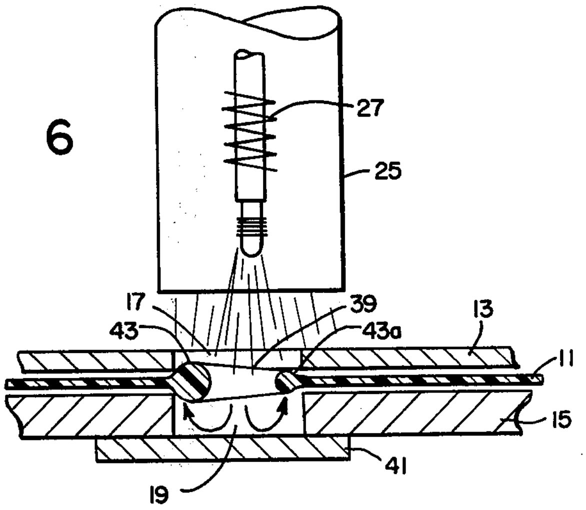

These and other features, advantages, and characteristics of this invention will be the more readily understood and appreciated from the ensuing more detailed description and from the drawings, wherein:

FIG. 1 is a perspective view showing apparatus according to the invention holding a plastic film material sheet to be wicket holed according to the invention;

FIGS. 2, 3, and 4 show various forms of apexed wicket holes in plastic film sheet materials according to the invention;

FIG. 5 is a sectional view through apparatus according to the invention showing a plastic film sheet in the process of being wicket holed; and FIG. 6 is a sectional view through FIG. 5 along the section line6–6.

In general, the invention comprehends a method of making an apexed hole having avarying thickness hole edge perimeter of melted and rehardened plastic in a plastic film sheet material comprising the steps of; masking the plastic film sheet material with a heat resistant masking template having an opening therein of a size and apexed shpe substantially congruent with a preselected size and apexed shape of the hole being formed; disposing the plastic film sheet material and the masking template on a backing template having an opening therein substantially similar to the size and shape of the opening in the masking template and having an overall perimetral dimension substantially equal to the overall perimetral dimension of the opening in the masking template, the opening in the masking template and the opening in the backing template being juxtaposed in substantially concentric alignment; directing a stream of gas heated to a temperature sufficient to effect rapid melting of the plastic film material into impingement on the masking template and the plastic film sheet material between the openings in the masking template and the backing template for a time sufficent to melt through the plastic film sheet material between said openings, the concentric centerline of said stream being offset juxtaposed openings in the masking and backing templates towards the apex of the hole being formed; removing the stream of gas from impingement on the masking template; and removing the plastic film sheet material from the templates after the melted plastic film aterial has at least partially rehardened.

With reference to the drawings, FIG. 1 shows a plastic film sheet 11 clamped between a masking template 13 and a backing template 15. Masking template 13 is provided with an opening 17, generally circular in form but with an outwardly extending notch or apex 19. Backing template 15 is provided with a similar but slightly larger opening 21 with an outwardly extending notch or apex 23.

Here it should be noted that while the form of wicket hole shown in some of the drawing figures for illustrative purposes is tear drop shaped, that is to say generally circular with a point or apex, other hole shapes are equally advantageous, it being necessary only that the hole have a stress concentration point, herein called an apex, on its perimeter oriented in the direction of the desired tearing direction, and that the perimetral bead of melted and rehardened plastic film material be somewhat thinner and weaker at the apex than elsewhere around the hole edge. FIGS. 2, 3, and 4 of the drawings show, respectively, plastic film sheets having wicket holes of the tear drop shape, a sharp pointed inverted V notch, and a keyhole shape, all of which are apexed in one form or another and yield desired results according to the invention. Other apexed shapes will work equally well.

Again with reference to FIG. 1, the assembled arrangement of the plastic film sheet, the masking template 13 and the backing template 15, clamped securely by any suitable means not shown in the drawings for purposes of simplification and clearer illustration, is shown positioned beneath a hole making head comprising a generally tubular outer housing 25 of any suitable insulative material, having an electrical heating element 27 disposed interiorly thereof and connected to electric circuit wires 29, 31 which pass through a connection bushing 33 mounted atop the housing 25. The circuit wires in turn connect to a suitable electric power circuit not shown in the drawings.

A gas supply conduit 35 connects concentrically through a flow control orifice to the top of the housing 25 through a bushing 37, and provides a stream of pressurized gas, compressed air for example, from a pressurized gas supply source not shown in the drawings.

The complete hole making head assembly is commercially available as a unit, one typical such apparatus being a flameless electric torch, known as a serpentine heater, manufactured and sold by Sylvania, General Telephone and Electronics of Exeter, New Hampshire, U.S.A.

FIG. 5 is an elevational sectional view showing a plastic film sheet 11 clamped between a masking template 13 and a backing template 15 disposed beneath a hole making head assembly comprising an outer housing 25 and an interiorly mounted electric heating element 27 with a wicket hole 39 in the process of being formed by a hot gas stream impinging downwardly as shown on the masking template and film material exposed in the masking template opening 17. In FIG. 5, a bottom plate 41 is shown subtending the underside of the backing template. This arrangement, it has been found, redirects the hot gas stream upward to the film underside as soon as hole formation starts and accelerates the melting process.

As the hole 39 forms, molten plastic film material retracts towards the hole edge, forming a bead 43 which, upon rehardening, acts to reinforce the hole edge against tearing.

FIG. 6, a section through FIG. 5, shows the epicentric offset of the concentric centerline of the hole making head assembly from the concentric centerline of the juxtaposed openings in the masking and backing templates in a direction towards the apex of the hole being formed. With this arrangement, the hole edge bead 43 is significantly thinned as a 43*a*, thus producing a hole with a reinforced edge all around except at one relatively weak point, the apex, which is located in the desired tearing direction.

EXAMPLE

In practice, the method and apparatus of the invention is automated.

In a typical operation with a production capability of 260 bags per minute, a commercially available flameless electric torch, Sylvania model No. DGH116501, was selected as a hole making head and mounted on a single revolution clutch drive powered by an electric motor. The hole making head was connected to a 50 psig compressed air line and a 55 volt A.C. electric supply source. The masking and backing templates were of ⅛ inch thick aluminum sheet material, each apertured for hole forming openings to a 7/32 inch diameter circular hole with a keyhole form notch 1/16 inch wide and 1/16 inch deep oriented in the desired bag tearing direction. A bottom plate of ⅛ inch thick aluminum was disposed and clamped below the backing template.

In operation, the hole making head moves reciprocally between a downward position with its outlet end ⅛ inch above the masking template wherein a 15 millisecond burst of approximately 1200°–1500°F hot air forms the wicket hole, and an upward position with its outlet end 1⅝ inches above the masking template. The motion of the head was arcuate, swinging between its upward and downward positions on an arc of 8½ inches radius from a pivot point 3¼ inches above the top surface of the masking template, and the centerline relationship was arranged so that in the downward or hole forming position, the centerline of the flameless torch, and thus the centerline of the hot air stream, was aligned directly with the tip of the apex of the hole form opening in the masking template. In the down or hole making position, the air to the hole making head is on, and is valved off during each up stroke. The electrical heating energy is on continuously.

Lipped bags fabricated from tubular stock of biaxially oriented polyvinylidene chloride and provided with wicket holes on this arrangement were tested in a commercial packaging operation in comparison with similar bags wicket holed by cold punching and by hot punching and found to be significantly superior in tear proneness from mounting wickets in the desired direction, to consistently tear more linearly and cleanly than the other bags, and to tear without producing any incidental shards or scraps of bag plastic film material.

Numerous alternative modes of practicing this invention will, in the light of the foregoing description, undoubtedly occur to persons familiar with the art. The backing template, for instance, may be in any form, from a plate as shown and described to a simple ring grommet or a tubular brace, it being necessary only that the film being holed be held up snugly against the masking template opening. Within practical limits, any hole shape may be used, it being essential only that the weakest and most tear prone point on the hole perimeter coincides with the apex which is oriented in the preselected tearing direction. It is intended therefore that the foregoing description be taken as illustrative only, and not construed in any limiting sense.

What is claimed is:

1. A method of making an apexed hole having a varying thickness hole edge perimeter of melted and rehardened plastic in a thermoplastic film sheet material comprising the steps of;

masking the thermoplastic film sheet material with a heat resistant masking template having an opening therein of a size and apexed shape substantially congruent with a preselected size and apexed shape of the hole being formed;

disposing the thermoplastic film sheet material and the masking template on a backing template having an opening therein of a size and shape substantially similar to the size and shape of the opening in the masking template, the opening in the masking template and the opening in the backing template being juxtaposed in substantially concentric alignment;

directing a stream of gas heated to a temperature sufficient to effect rapid melting of the thermoplastic film material into impingement on the masking template and the thermoplastic film sheet material between the openings in the masking template and the backing template for a time sufficient to melt through the thermoplastic film sheet material between said openings, the concentric centerline of said stream being offset epicentrically from the concentric centerline of the juxtaposed openings in the masking and backing templates towards the apex of the hole being formed;

removing the stream of gas from impingement on the masking template; and removing the thermoplastic film sheet material from the templates after the melted thermoplastic film material has at least partially rehardened.

2. A method according to claim 1 with the added step of redirecting the gas stream, in a direction counter to its initial flow, from the opening in the backing template towards the opening in the masking template.

* * * * *